United States Patent [19]

Reibl

[11] Patent Number: 5,708,858
[45] Date of Patent: Jan. 13, 1998

[54] PHOTOGRAPHIC CAMERA

[75] Inventor: Michael Reibl, Boeblingen, Germany

[73] Assignee: Eastman Kodak Company, Rochester, N.Y.

[21] Appl. No.: 794,288

[22] Filed: Feb. 3, 1997

Related U.S. Application Data

[63] Continuation of Ser. No. 570,420, Dec. 11, 1995, abandoned.

[30] Foreign Application Priority Data

Dec. 17, 1994 [DE] Germany .................. 44 45 153.9

[51] Int. Cl.⁶ .......................... G03B 17/08; G03B 13/06
[52] U.S. Cl. .................. 396/25; 396/382; 396/529; 396/535
[58] Field of Search .................. 354/64, 288; 348/81; 396/25, 424, 448, 529, 535, 541, 71, 6, 373, 382

[56] References Cited

U.S. PATENT DOCUMENTS

| 4,041,507 | 8/1977 | Ko et al. ........................ 354/64 |
| 4,292,268 | 9/1981 | Salensky ........................ 264/236 |
| 4,811,039 | 3/1989 | Maeno et al. .................. 354/64 |
| 4,931,816 | 6/1990 | Kamo et al. .................... 354/64 |
| 4,946,427 | 8/1990 | Rampe ............................ 474/161 |
| 5,294,988 | 3/1994 | Wakabayashi et al. ........ 348/373 |
| 5,576,781 | 11/1996 | Deleeuw ........................ 396/6 |
| 5,608,486 | 3/1997 | Takagi et al. .................. 396/6 |
| 5,628,039 | 5/1997 | Muramatsu et al. .......... 396/296 |

FOREIGN PATENT DOCUMENTS 42 12 845 A1  10/1992  Germany .............. G03B 13/10

Primary Examiner—Safet Metjahic
Assistant Examiner—Christopher E. Mahoney
Attorney, Agent, or Firm—Roger A. Fields

[57] ABSTRACT

The photographic camera has a watertight housing (11, 12) in which a film transport and guide mechanism, a taking lens (15), a viewfinder (16), as well as a flash unit are accommodated. The novel and inventive step consists in that an integral support member (14) is provided which is connected with housing (11, 12) in a watertight manner and into which the taking lens (15), the viewfinder lens (16) as well as the diffusion screen (17) of the flash unit are all integrated.

4 Claims, 3 Drawing Sheets

PHOTOGRAPHIC CAMERA

This is a Continuation of application Ser. No. 08/570, 420, filed Dec. 11, 1995, now abandoned.

FIELD OF THE INVENTION

The invention relates to a photographic camera with a watertight housing which accommodates a film transport and film guide mechanism, a taking lens as well as a viewfinder means and, in a further embodiment, a flash unit.

BACKGROUND OF THE INVENTION

Photographic cameras with watertight housings are known. German OS 42 12 845, for example, discloses a watertight camera whose camera body comprises a rear cover which in its closed condition defines a space made watertight by means of a rubber sealing hidden between the rear cover and the camera body.

Moreover, watertight cameras are known which are contained in a separate watertight housing consisting of a transparent material. However, additional steps are necessary in such cameras to operate the shutter release and the film transport mechanism. Handling of the camera is thus made complicated, and the manufacturing costs are considerably increased.

SUMMARY OF THE INVENTION

The camera to which the invention relates is a so-called single-use camera which is loaded with photographic film in the manufacturing plant and, after exposure of the film, is taken by the camera user to a finisher who develops the film and returns the camera to the manufacturing company. The manufacturer uses those components as are still utilizable in the manufacture of another camera of the same type or reconditions camera components for further use. In this manner unnecessary waste is avoided and components of high value and durability are made use of several times.

A camera of the aforementioned type should have a camera housing of as simple a design as possible, for example a housing without a pivotable rear cover, which nevertheless allows photographic film to be easily loaded and unloaded. It should bee of an uncomplicated structure so that it can be readily assembled and, it should also be reliable as far as its water thightness is concerned.

In the case of a camera of the aforementioned type this is achieved in accordance with the invention in that an integral support member is provided which is connected with the housing in a watertight manner and into which both the taking lens and the viewfinder lens are integrated.

According to a further embodiment the inventive step in a photographic camera with a watertight housing accommodating a film transport and film guide mechanism, a taking lens, a viewfinder means as well as a flash unit is considered to consist in that an integral support member is provided which is connected with the housing in a watertight manner and into which the taking lens, the viewfinder lens as well as the diffusion screen of the flash unit are all integrated.

German OS 24 07 779 discloses a camera wherein a device with an auxiliary lens and a viewfinder correction lens can be attached to a camera housing. However, the device with the optical members is not an integral unit and it is not weatherproof and watertight either.

In detail the invention is such that the integral support member consists of a plastic injection-molded unit into which the taking lens, the viewfinder lens and the diffusion screen of the flash unit are molded.

According to an advantageous further modification of the invention, a viewfinder eyepiece may be additionally integrated into the support member. The viewfinder eyepiece is connected with the support member by a web such that the support member forms an integral plastic injection-molded unit including the taking lens, the viewfinder lens, the viewfinder eyepiece and the diffusion screen.

BRIEF DESCRIPTION OF THE DRAWINGS

Further features and advantages can be inferred from the description of embodiments of the invention illustrated in the drawing as well as from the further subclaims.

The drawing shows in

DETAILED DESCRIPTION OF THE INVENTION

Figure 1:
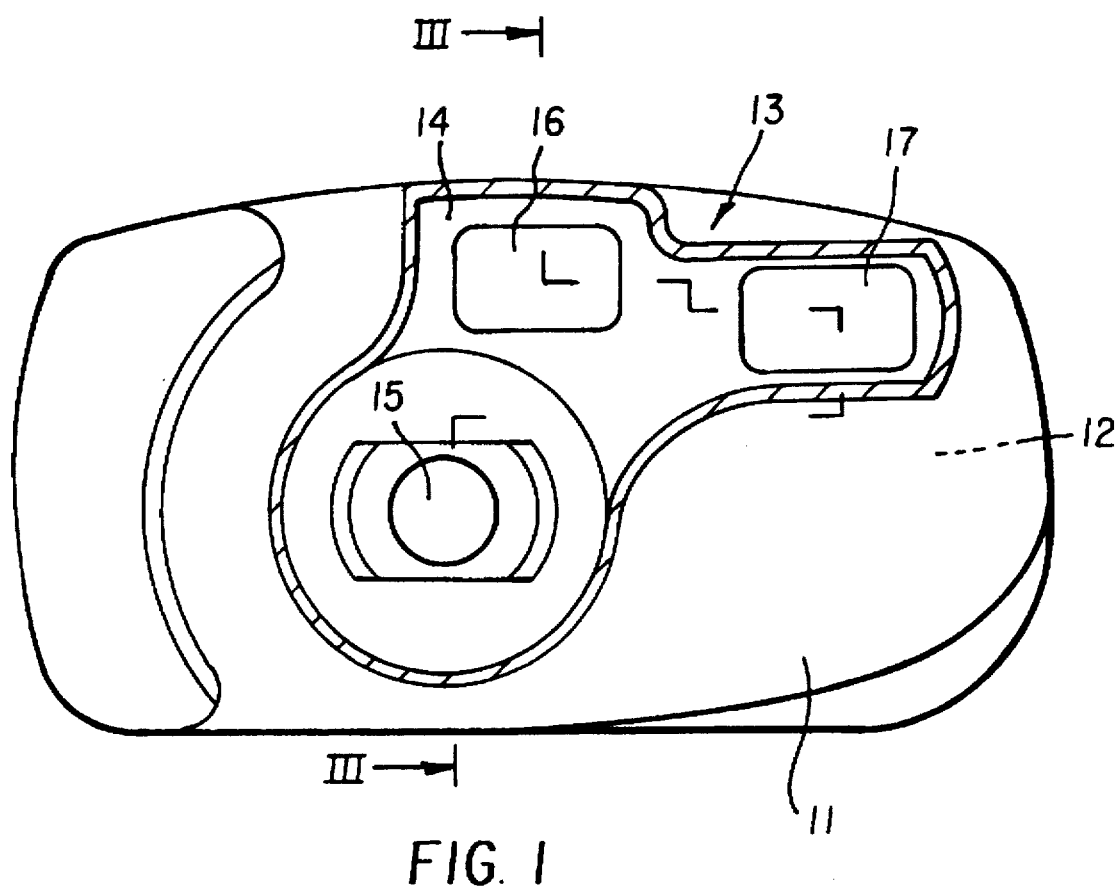
FIG. 1 a front view of the camera according to the invention.
Figure 2:
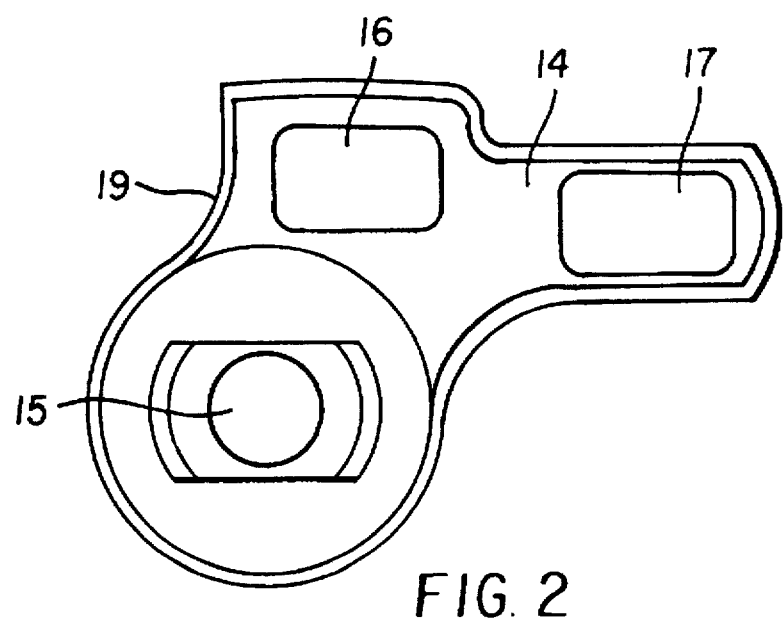
FIG. 2 a front view of the support member according to the invention for the camera according to FIG. 1, FIG. 3 a section along line III—III through the camera according to FIG. 1, FIG. 4 a sectional view of a further embodiment of the camera according to FIG. 1, FIG. 5 a sectional view of a further embodiment of the camera according to FIG. 1, and FIG. 6 a sectional view of a further embodiment of the camera according to the invention.

The drawing shows a photographic camera of the so-called single-use type. Such a camera is loaded with photographic film by the manufacturer and sold by the dealer in its loaded state. After the film strip has been completely exposed the camera together with the film is taken to a finisher who removes the film strip for development. The camera housing is returned to the manufacturer where it is reconditioned and loaded with another photographic film strip. Cameras of this type are of a very simple design so that they can be sold at a favorable price. However they must have specific functional features so that they can be used in a great variety of situations and are easy to handle.

The camera shown in FIG. 1 consists of two housing shells 11 and 12 of about equal sizes, housing shell 11 forming the camera front portion, and housing shell 12 the camera rear portion.

Housing shell 11 which forms the camera front portion is provided with a recess 13 into which a support member 14 can be inserted which includes a taking lens 15, a viewfinder lens 16 and a diffusion screen 17 of a flash unit.

In the case of the embodiments illustrated in the drawing support member 14, taking lens 15 and viewfinder lens 16 form an integral plastic injection-molded unit into which the optical members are integrated. The entire unit is made of a transparent plastic material, i.e. a plastic material having optical properties should be used.

Figure 3:
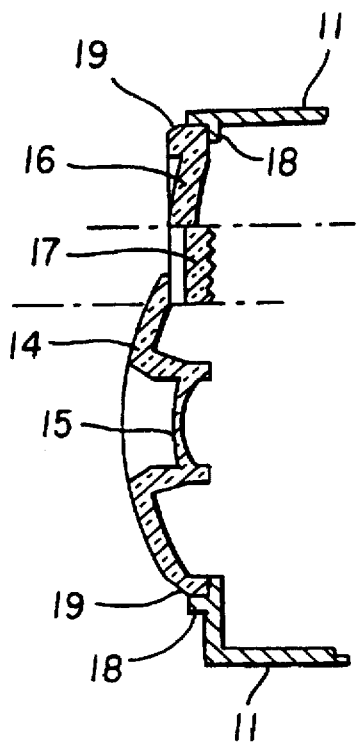

It can be seen from FIG. 3 how such a support member 14 is inserted into front housing shell 11. The housing shell features receiving flanges 18 in which the peripheral edge 19 of support member 14 is held. Support member 14 is held resiliently biased in the receiving flanges 18 by means of a snap connection. However its peripheral edge 19 may also just be connected with the receiving flanges 18 of front housing shell 11 by means of an adhesive.

In this manner a camera of the type concerned is provided which is of an uncomplicated design and can be manufactured at low cost.

Figure 4:
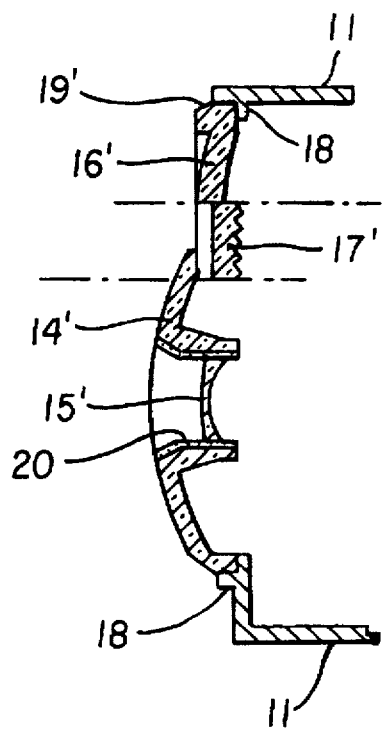

FIG. 4 depicts a camera with a support member 14' wherein in the area around taking lens 15', a dark-colored sheet 20 is provided by injection molding for the purpose of excluding disturbing light reflections. Such a support member has to be manufactured using the dual-component injection-molding process.

Figure 5:
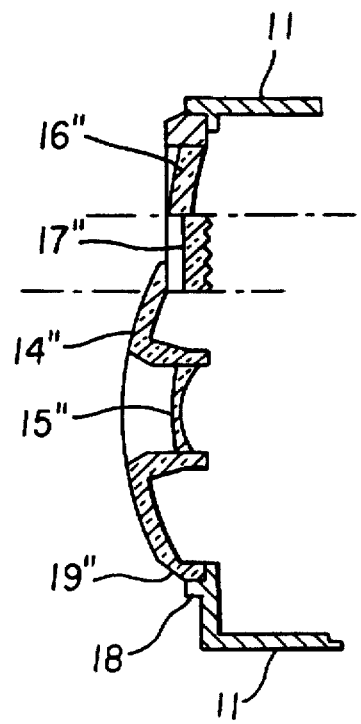

FIG. 5 shows a support member 14" wherein the optical members, taking lens 15", viewfinder lens 16" and diffusion screen 17" are made from a plastic having optical properties such as polycarbonate, whereas support member 14" is made from a plastic material without optical properties such as polyvinyl chloride. In this case, too, support member 14" has to be manufactured using the dual-component injection-molding process.

Figure 6:
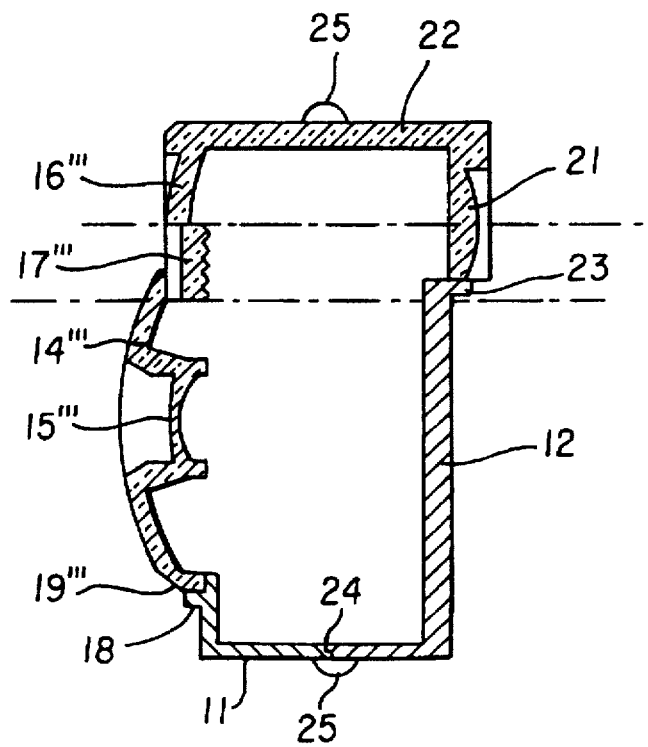

Finally a further modification of the camera according to the invention is illustrated in FIG. 6. Here a viewfinder eyepiece 21 has been integrated into the support member 14'" in addition to taking lens 15'", viewfinder lens 16'" and diffusion screen 17'". For this purpose the viewfinder eyepiece 21 positioned on the same optical axis as viewfinder lens 16'" is connected with support member 14'" by means of a web 22. The support member 14'", the taking lens 15'", the viewfinder lens 16'", the web 22 and the viewfinder eyepiece 21 thus form an integral unit which is obtained by injection molding.

Owing to its U-shaped cross-section this support member 14'" is resiliently biased and thus held in an advantageous manner on the camera housing in which its peripheral edge 19'" is received in the receiving flange 18 of front housing shell 11 and the receiving flange 23 of rear housing shell 12.

In the embodiment according to FIG. 6, the partition plane 24 of the two housing shells 11 and 12 is sealed by means of an endless resilient insertion member 25 extending around the camera in the area of partition plane 24 and biased into contact with the housing.

In the case of a snap connection, additional sealing means can be moreover provided between the peripheral edge 19 and the receiving flanges 18 within the latter.

I claim:

1. A camera assemblage comprising:

an exterior support member (14) provided with a taking lens (15) and a viewfinder lens (16), said exterior support member and its lenses being constructed of the same material integrally as a single-piece unit; and a camera front housing portion (11) provided without any taking and viewfinder lenses, but having means (13) for receiving said exterior support member with its lenses on an outside of the camera front housing portion in order to provide taking and viewfinder lenses for the camera front portion.

2. A camera assemblage as recited in claim 1, wherein said camera front housing portion has a resilient flange (18) for holding said exterior support member with said taking and viewfinder lenses at an edge (19) of the exterior support member.

3. A camera assemblage as recited in claim 1, wherein said exterior support member has a dark colored sheet (20) around said taking lens to minimize light reflections.

4. A camera assemblage as recited in claim 1, wherein said exterior support member is completely transparent.

* * * * *